United States Patent

Hirata

[11] Patent Number: 6,152,741
[45] Date of Patent: Nov. 28, 2000

[54] DEVICE FOR TEACHING ELECTROSTATIC PRINCIPLES

[76] Inventor: Gloriane Hirata, 21150 Fortini Rd., San Jose, Calif. 95120

[21] Appl. No.: 09/370,609

[22] Filed: Aug. 7, 1999

[51] Int. Cl.$^7$ .................................................. G09B 23/06
[52] U.S. Cl. ............................................ 434/301; 434/300
[58] Field of Search ....................... 434/300, 301; 446/131, 133, 135, 137, 138, 139, 166, 167; 84/402

[56] References Cited

U.S. PATENT DOCUMENTS

| | | | |
|---|---|---|---|
| 3,289,321 | 12/1966 | Sussman . | |
| 3,698,128 | 10/1972 | Moeser . | |
| 4,045,156 | 8/1977 | Chu et al. | 431/95 R |
| 4,506,892 | 3/1985 | Shacket | 273/153 R |
| 5,121,568 | 6/1992 | Lindmeyer | 43/42.31 |
| 5,188,555 | 2/1993 | Zbegner | 446/133 |
| 5,598,063 | 1/1997 | Mathews et al. | 313/623 |
| 5,659,143 | 8/1997 | Isackson | 84/402 |

*Primary Examiner*—Sam Rimell
*Assistant Examiner*—Bena B. Miller
*Attorney, Agent, or Firm*—Miller Mash LLP

[57] ABSTRACT

The invention is a training device for illustrating electrostatic charges. The training device consists of a transparent tube that is capped at each end. Retained within the tube are a plurality of metallic beads. Each bead has a metal skin and a low density interior core made of plastic. The beads pickup electrostatic charges when the tube is rubbed and thereby demonstrate how these forces are generated.

1 Claim, 1 Drawing Sheet

DEVICE FOR TEACHING ELECTROSTATIC PRINCIPLES

TECHNICAL FIELD

This invention relates to teaching aids that are used for science demonstrations. More particularly, the invention relates to a device for demonstrating electrostatic charges.

BACKGROUND INFORMATION

The present invention is an improvement on an earlier device that has been used by educators to demonstrate how electrostatic charges are created. The earlier device is made of a transparent plastic tube. The tube is closed at each end and holds a large number of small particles. These particles are typically made from styrofoam or another low density material that can hold an electrostatic charge. Rubbing the tube with a cloth creates a positive and negative charge between the walls of the tube and the particles. The particles stick to the inside walls of the tube, since opposite charges create an attractive force.

Teachers use the device in a classroom to explain simple concepts relating to electricity, electrical charges, and the like. The problem with the device is that the particles tend to not lose their charge quickly, which makes it hard to repeat demonstrations during a classroom lecture. This also tends to reduce the effectiveness of the tool as a teaching aid.

The invention is an improvement on the device described above. The differences between the improvement and the above device are summarized and described below.

SUMMARY OF THE INVENTION

The invention is a transparent plastic tube that is capped at both ends. The tube holds a large number of metallic beads. Each bead has a metal skin covering a core made of a low density material.

The metal skin on each bead causes it to pickup an electric charge when the tube is rubbed. The low density core makes each bead lighter than it would otherwise be if it was made from solid metal. The core enables the beads to "stick" onto and around the inside walls of the tube, because the generated electrostatic forces are greater than the force of gravity acting against the beads.

BRIEF DESCRIPTION OF THE DRAWINGS

In the drawings, like reference numerals and letters refer to like parts throughout the various views, and wherein.

BEST MODE FOR CARRYING OUT THE INVENTION

Figure 1:
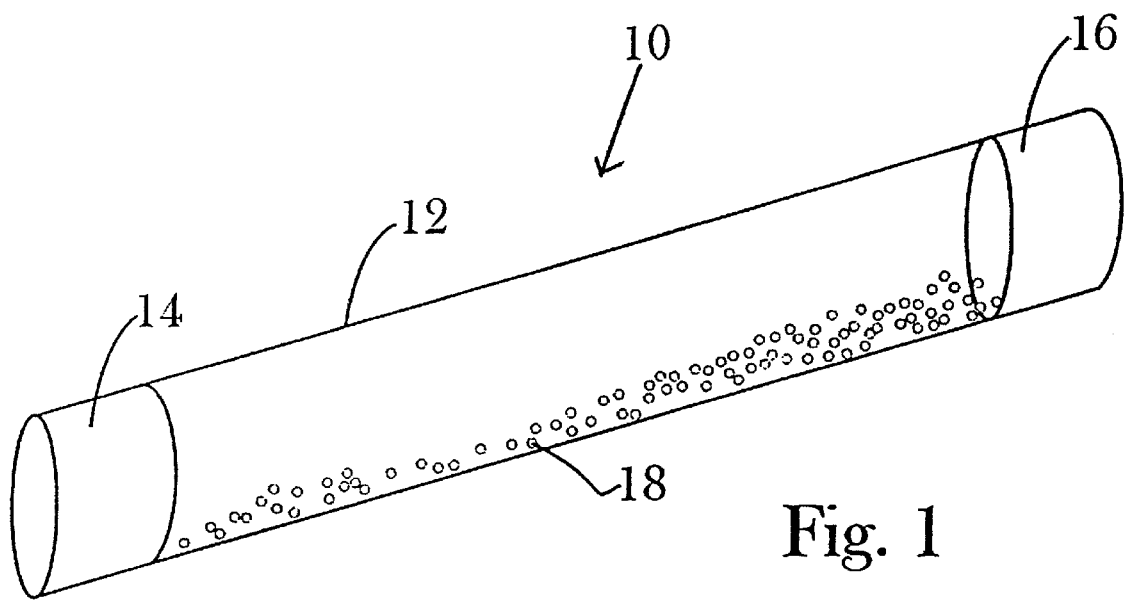
FIG. 1 is a pictorial view of the invention.

Referring now to the drawings, and first to FIG. 1, shown generally at ten is an electrostatic tube constructed in accordance with a preferred embodiment of the invention. The tube 10 is made of transparent plastic, indicated at 12 (a number of common plastics can be used to make the tube). Each end is capped, as shown at 14, 16, respectively. Retained within the tube are a plurality of beads 18.

Figure 2:
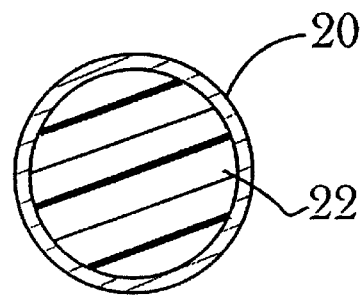
FIG. 2 is a cross-sectional view of a bead.

Referring now to FIG. 2, each bead is a copper-coated plastic ball having a metal skin 20 and a low density plastic core 22. Beads that are suitable for use in connection with the device are known as "blasting beads." This type of bead is commonly used to clean machinery. They can be ordered from the Thomas Registry™ under "Blasting Beads."

The device 10 is used by simply rubbing a cloth rapidly against its outer surface. This generates electrostatic charges in both the beads and the wall of the tube and causes the beads to stick around the interior circumference of the tube's walls.

The above description is not meant to limit the scope of patent coverage. Patent coverage is to be limited solely by the patent claim or claims that follow.

What is claimed is:

1. An instructional device for teaching students and other persons about electrostatic charges, comprising:

a transparent tube; and a plurality of generally spherically shaped beads loosely confined in the tube, wherein each bead is made of a low density plastic material covered by a metal skin such that the beads can retain electrostatic charges.

* * * * *